(12) United States Patent
Block

(10) Patent No.: US 9,827,843 B2
(45) Date of Patent: Nov. 28, 2017

(54) ROLLER HAVING A DRIVEN WHEEL, LOAD TRUCK COMPRISING A ROLLER HAVING A DRIVEN WHEEL AND OPERATING DEVICE

(71) Applicant: TENTE GmbH & Co. KG, Wermelskirchen (DE)

(72) Inventor: Wolfgang Block, Wermelskirchen (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 14/899,363

(22) PCT Filed: Jun. 12, 2014

(86) PCT No.: PCT/EP2014/062231
§ 371 (c)(1),
(2) Date: Dec. 17, 2015

(87) PCT Pub. No.: WO2014/202454
PCT Pub. Date: Dec. 24, 2014

(65) Prior Publication Data
US 2016/0144709 A1    May 26, 2016

(30) Foreign Application Priority Data

Jun. 19, 2013 (DE) .................. 10 2013 106 381
Jun. 6, 2014 (DE) .................. 10 2014 108 002

(51) Int. Cl.
*B60B 19/12* (2006.01)
*B60K 7/00* (2006.01)
(Continued)

(52) U.S. Cl.
CPC ............ *B60K 7/0007* (2013.01); *B60B 19/12* (2013.01); *B60B 33/0039* (2013.01); *B62B 3/00* (2013.01);
(Continued)

(58) Field of Classification Search
CPC ....... B60B 19/12; B60B 33/0039; B62B 3/00; B62B 5/004; B62B 5/0043; B62B 5/0069
See application file for complete search history.

(56) References Cited

U.S. PATENT DOCUMENTS 1,481,593 A * 1/1924 Fieux ...................... F16D 43/22
192/103 B
1,808,748 A * 6/1931 Apple ...................... H02K 7/14
180/60
(Continued)

FOREIGN PATENT DOCUMENTS

CN   202 933 165 U   5/2013
DE   196 14 411 A1   10/1996
(Continued)

OTHER PUBLICATIONS

International Search Report of PCT/EP2014/062231, dated Nov. 10, 2014.

*Primary Examiner* — Emma K Frick
*Assistant Examiner* — Brian L Cassidy
(74) *Attorney, Agent, or Firm* — Collard & Roe, P.C.

(57) ABSTRACT

A wheel of a roller includes a roller axis, the wheel being driven by an electric motor, wherein the electric motor is a hub motor which drives a hub body, which extends with circumferential spacing and surrounds the wheel axle, relative to the fixed wheel axle, wherein furthermore the wheel has a running surface. The running surface is formed on a running surface carrier and the running surface carrier is supported flush on the hub body at the back of the running surface. Further, a manually movable load truck includes one or more rollers, of which at least one roller has a driven wheel. Further, an operating device, in particular for a manually movable load truck, is formed having a substantially annular cross-section having a central through opening.

15 Claims, 10 Drawing Sheets

(51) Int. Cl.
  *B60B 33/00*  (2006.01)
  *B62B 5/00*   (2006.01)
  *B62B 3/00*   (2006.01)
  *B62B 3/14*   (2006.01)

(52) U.S. Cl.
  CPC ............ *B62B 5/004* (2013.01); *B62B 5/0043* (2013.01); *B62B 5/0069* (2013.01); *B62B 3/1476* (2013.01)

(56) References Cited

U.S. PATENT DOCUMENTS

| | | | | |
|---|---|---|---|---|
| 3,013,543 A * | 12/1961 | Euler | ............... | F02B 25/00 123/55.7 |
| 3,717,318 A | 2/1973 | Yamasita | | |
| 3,812,928 A * | 5/1974 | Rockwell | ............ | B60K 7/0007 105/55 |
| 5,167,389 A * | 12/1992 | Reimers | ............ | B60L 11/18 180/19.1 |
| 5,180,023 A * | 1/1993 | Reimers | ............ | B60L 11/18 180/167 |
| 5,343,128 A * | 8/1994 | Beltrame | ............ | B60K 7/0007 280/DIG. 5 |
| 5,633,544 A * | 5/1997 | Toida | ............ | B60K 7/0007 180/65.1 |
| 5,691,584 A * | 11/1997 | Toida | ............ | H02K 1/185 180/65.51 |
| 5,746,282 A | 5/1998 | Fujiwara et al. | | |
| 5,940,932 A * | 8/1999 | LaHay | ............ | B60B 33/06 16/30 |
| 6,276,471 B1 | 8/2001 | Kratzenberg et al. | | |
| 6,328,123 B1 * | 12/2001 | Niemann | ............ | B60K 7/0007 180/65.51 |
| 6,367,571 B1 * | 4/2002 | Schwarz | ............ | B60K 7/0007 180/252 |
| 6,617,719 B2 * | 9/2003 | Sunaga | ............ | H02K 3/50 310/64 |
| 6,768,932 B2 * | 7/2004 | Claypole | ............ | B60G 13/14 280/781 |
| 7,000,933 B2 * | 2/2006 | Arling | ............ | B62D 51/008 180/218 |
| 7,100,722 B2 * | 9/2006 | Bowen | ............ | B60K 7/0007 180/65.51 |
| 7,200,894 B2 * | 4/2007 | Block | ............ | B60B 33/0039 16/18 R |
| 7,245,052 B2 * | 7/2007 | Stubner | ............ | B60K 7/0007 180/65.51 |
| 7,392,872 B2 * | 7/2008 | Chiu | ............ | B60K 1/04 180/65.1 |
| 7,392,995 B2 * | 7/2008 | Lin | ............ | B62B 1/18 180/65.1 |
| 7,445,067 B2 * | 11/2008 | Marsh | ............ | B60G 3/00 180/65.51 |
| 7,579,738 B2 * | 8/2009 | Cros | ............ | B60L 11/1803 310/216.004 |
| 7,581,748 B2 * | 9/2009 | Reimers | ............ | B62B 5/0026 280/651 |
| 7,635,037 B2 * | 12/2009 | Treadwell | ............ | B62B 5/005 180/19.3 |
| 8,025,116 B2 * | 9/2011 | Rogg | ............ | B60K 7/0007 180/65.51 |
| 8,210,974 B2 * | 7/2012 | Moeller | ............ | B62M 6/65 180/65.51 |
| 8,245,804 B2 * | 8/2012 | van Rooij | ............ | B62M 6/65 180/65.51 |
| 8,464,843 B2 * | 6/2013 | Qiu | ............ | B60B 33/0007 188/1.12 |
| 8,484,801 B2 * | 7/2013 | Li | ............ | B60B 7/02 16/18 CG |
| 8,578,984 B2 * | 11/2013 | Hannah | ............ | B60B 23/10 152/176 |
| 8,678,117 B2 * | 3/2014 | Carabelli | ............ | H02K 7/102 180/65.51 |
| 8,700,239 B2 * | 4/2014 | Perry | ............ | B60K 6/48 180/165 |
| 8,706,332 B2 * | 4/2014 | Kume | ............ | B62B 3/001 180/19.3 |
| 8,807,251 B2 * | 8/2014 | Pandya | ............ | B60K 7/0007 180/55 |
| 8,807,254 B2 * | 8/2014 | Manus | ............ | B60K 7/0007 180/65.51 |
| 9,108,462 B1 * | 8/2015 | Stone | ............ | B60B 33/0023 |
| 9,387,758 B2 * | 7/2016 | Heinen | ............ | B60K 7/0007 |
| 2003/0197423 A1 * | 10/2003 | Liao | ............ | B60B 1/006 301/111.03 |
| 2005/0034912 A1 | 2/2005 | Gotz | | |
| 2006/0016628 A1 | 1/2006 | Heinen | | |
| 2010/0052412 A1 * | 3/2010 | Morris | ............ | B29C 45/1657 301/64.701 |
| 2010/0181122 A1 | 7/2010 | Block et al. | | |
| 2013/0097808 A1 * | 4/2013 | Long | ............ | B60B 33/0015 16/18 CG |
| 2013/0299252 A1 | 11/2013 | Block et al. | | |
| 2016/0082772 A1 * | 3/2016 | Biderman | ............ | A61G 5/045 301/6.5 |
| 2016/0121652 A1 * | 5/2016 | Han | ............ | B60B 33/028 16/35 R |

FOREIGN PATENT DOCUMENTS

| | | |
|---|---|---|
| EP | 2 659 810 A1 | 11/2013 |
| GB | 1 378 758 A | 12/1974 |
| WO | 99/04122 | 1/1999 |
| WO | 2007/093549 A1 | 8/2007 |
| WO | 2012/110283 A1 | 8/2012 |

* cited by examiner

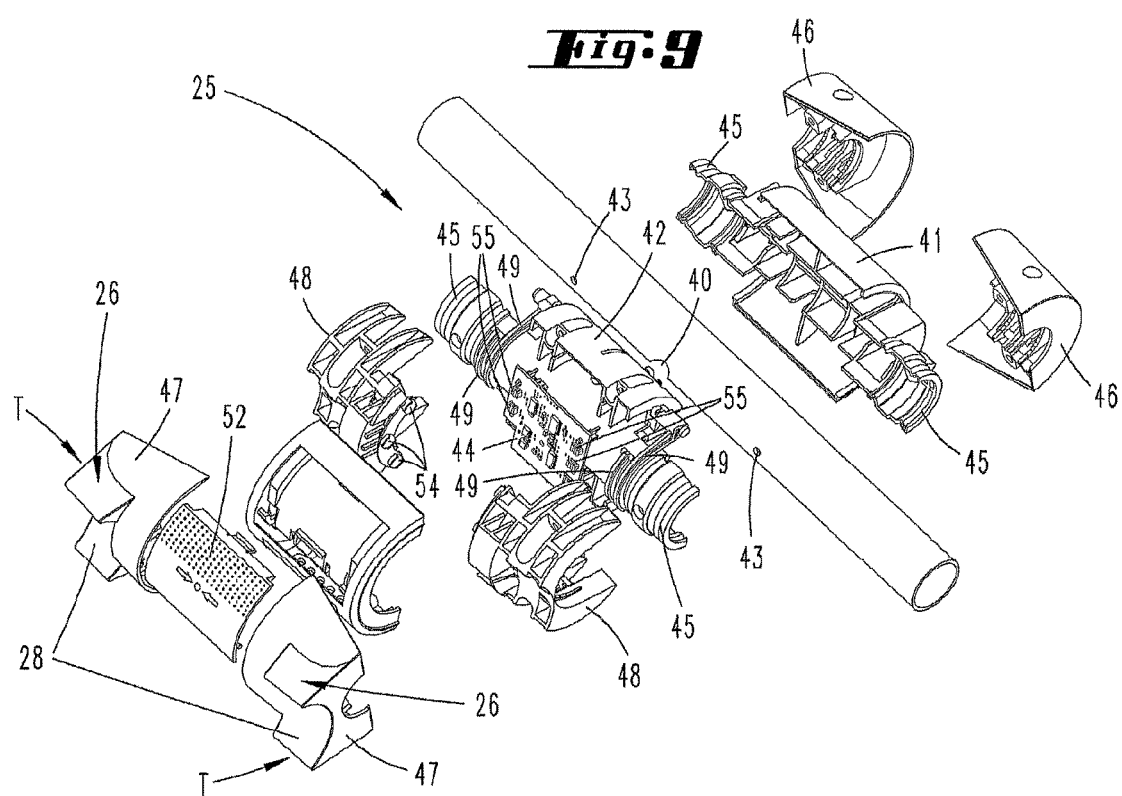

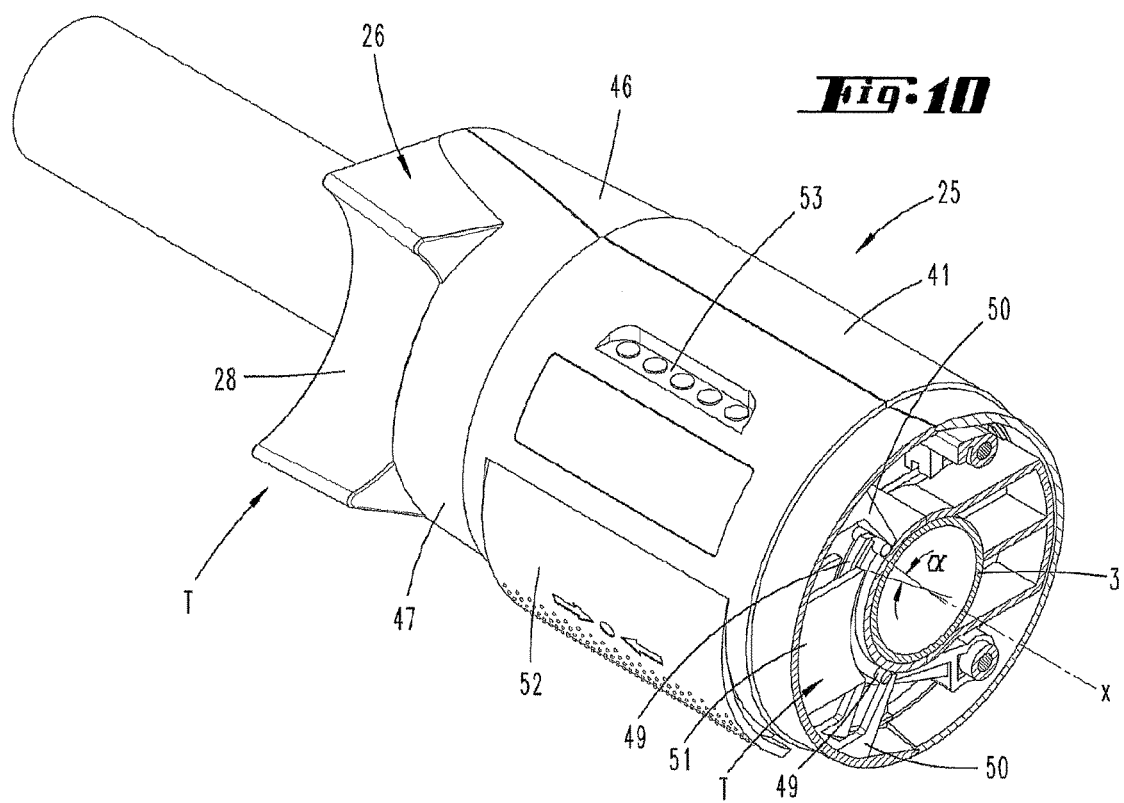

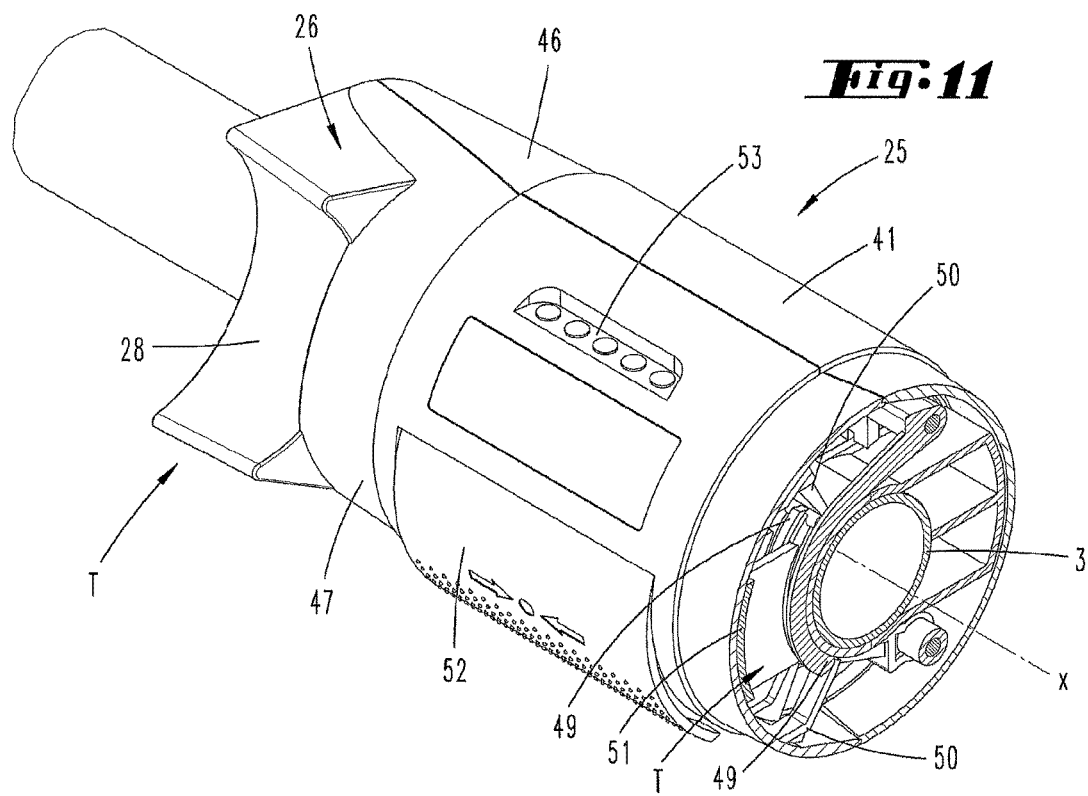

ROLLER HAVING A DRIVEN WHEEL, LOAD TRUCK COMPRISING A ROLLER HAVING A DRIVEN WHEEL AND OPERATING DEVICE

CROSS REFERENCE TO RELATED APPLICATIONS

This application is the National Stage of PCT/EP2014/062231 filed on Jun. 12, 2014, which claims priority under 35 U.S.C. §119 of German Application Nos. 10 2013 106 381.0 filed on Jun. 19, 2013 and 10 2014 108 002.5 filed on Jun. 6, 2014, the disclosures of which are incorporated by reference. The international application under PCT article 21(2) was not published in English.

The invention firstly pertains to a roller with a wheel that is driven by an electric motor and has a wheel axle, wherein the electric motor is a hub motor that drives a hub body surrounding the wheel axle with circumferential spacing relative to the stationary wheel axle, and wherein the wheel furthermore features a running surface.

The invention also pertains to a manually maneuverable load truck with one or more rollers, at least one of which features a driven wheel.

The invention furthermore pertains to an operating device, in particular, for use in connection with the aforementioned load truck.

Such wheels, which are driven by an electric motor and feature rollers that are also referred to as driven rollers below, have been disclosed in different variations. In this respect, we refer, for example, to publications WO 2007/093549 A1 (U.S. 2010/0181122 A1) and WO 2012/110283 A1.

In the driven rollers disclosed in the cited publications, the electric driving motor and the wheel are arranged on a common shaft, but the electric motor is arranged outside the wheel. Hub motors have furthermore been disclosed, in particular, in connection with bicycles that are driven by electric motors. In this case, the electric motor is accommodated in the hub of the wheel.

With respect to the prior art, we also refer to US 2005/0034912 A1. The hub motor known from this publication features a rotating axle while the motor or external rotor is stationary relative thereto. U.S. Pat. No. 6,276,471 B1 discloses a roller with a wheel, in which the drive is realized by means of a hub motor. WO-A-99/04122 ultimately also discloses a hub motor with a hub body that surrounds the wheel axle with circumferential spacing and is driven relative to the stationary wheel axle, wherein the wheel features an integrally designed running surface.

An objective with respect to hub motors of rollers of the type used, for example, on manually maneuverable load trucks can be seen in disclosing an overall construction of a wheel that includes a tire or a running surface and does not have an excessively large structural size.

Based on the aforementioned prior art, the invention aims to disclose a driven roller that features an electric motor and has an advantageous construction.

According to a first aspect of the invention, this objective is attained with the object of claim 1, in which it is proposed that the running surface of the wheel is realized on a running surface carrier and the running surface carrier is supported on the hub body in a planar fashion on the rear side of the running surface. In this way, the hub body can be used without restrictions for accommodating the components of the electric motor. The direct planar support of the running surface carrier on the hub body makes it possible to achieve a high stability and at the same time a compact structural shape.

The invention particularly concerns load trucks that are usually pushed or pulled manually by a user. However, it would also be desirable to move this load truck in a motor-driven fashion, particularly when it carries high loads. To this end, the invention proposes to provide the load truck with a motor-driven roller according to one of the embodiments described herein.

However, it is also particularly preferred that the load truck can nevertheless still be maneuvered manually. This may be the case, for example, when the motor-driven roller is deactivated or when the load truck can be moved faster manually than by means of the activated roller with the aid of an overrunning clutch. The overrunning clutch, particularly of a hub motor, may be realized with a corresponding constructive design, i.e. it may not require a special component.

Such a load truck with a roller that is driven by an electric motor preferably can also be controlled. The load truck preferably can be controlled with respect to the speed of the driven rollers or with respect to the activation and deactivation of the driven roller or the wheel located therein.

The invention accordingly also aims to disclose an advantageous control device, in particular, for use in connection with a load truck and/or a roller driven by an electric motor.

In this respect, the invention proposes that the control device is essentially realized with a cross section in the shape of a circular ring and features a central through-opening, and that one or more control elements are provided and movable relative to the otherwise stationary control device.

The through-opening may be penetrated, for example, by a holding bar of the load truck. In this way, the control device can be conveniently actuated on such a load truck.

It is firstly preferred that the running surface carrier of the wheel is realized in a pot-like fashion, wherein a pot bottom extends outside the hub body and essentially perpendicular to the wheel axle.

The hub body itself preferably also has an essentially cylindrical design, wherein cylinder sections of different diameter may be realized behind one another viewed in the direction of the roller axle.

The pot-shaped running surface carrier may be arranged such that it overlaps one side of the hub body. In this case, a pot wall overlaps the circumferential wall of the hub body and the pot bottom approximately extends in the same direction as a lateral surface of the hub.

Significant heat development may occur in such a hub motor depending on the rated power and the power demand. In order to advantageously dissipate this heat, one embodiment proposes to realize an outer surface of the running surface carrier with ribs. In this context, it is advantageous to realize the running surface itself narrower than the overall width of the hub body viewed in the direction of the wheel axle. Consequently, a section of the running surface carrier remains in the circumferential direction and can be used for realizing the aforementioned ribs.

It is furthermore preferred that the hub body is also realized with ribs, particularly ribs extending in the circumferential direction, in the region in which it is not covered by the running surface carrier.

The hub body may alternatively or additionally also be realized with ribs, particularly in its region that points in the direction of the wheel axle. These ribs then leave open an air path directly to the electric motor. The electric motor may be realized in the form of a completely encapsulated electric motor in this context, but also independently thereof.

For example, the running surface itself may be vulcanized onto the running surface carrier. In other words, this means that a pot-shaped part with a peripheral rubber ring or the like on the outer side of the pot wall is practically produced in this case.

However, the running surface may also be sprayed on the by means of a plastic spraying method. It may consist, e.g., of polyurethane, namely also cast polyurethane. The running surface may furthermore also consist of a thermoplastic elastomer.

Furthermore, the roller is preferably equipped with a roller fork that is made of a sheet metal part, the width of which corresponds to ten-times the thickness of the sheet metal part or may even be greater, for example, up to two hundred-times or three hundred-times the thickness of the sheet metal part. In this respect, it is important that a metal sheet, which may also be comparatively thin, is shaped into a fork and connected to the roller, for example, at the roller axle. In this way, a thermally conductive connection can also be produced in the region of the connection with the roller such that heat can also be dissipated via the thusly created relatively large surface of the fork.

In another embodiment, the roller fork may be realized in a U-shaped fashion. In the operative position, the U-crossbar lies above the roller axle and approximately in a plane that extends practically parallel to a horizontal plane, in which the roller axle extends. The U-limbs of the roller fork extend essentially perpendicular to the U-crossbar.

It is furthermore preferred that the roller features a horizontally aligned enclosure part. This enclosure part should enclose the roller over an angular range of at least 180°. This on the one hand makes it possible to realize a shock protection of sorts such that this enclosure part comes in contact with a foreign object rather than the roller itself. When the roller is driven by the electric motor, for example, it can thereby be prevented from inadvertently rolling onto such an object. This can result in the loading platform being raised on one side and therefore could obviously cause the load to shift.

The enclosure part independently or additionally also serves as a foot protection in order to largely prevent the roller from inadvertently rolling over a foot.

The aforementioned enclosure part preferably is likewise made of a thin sheet metal part. Since the enclosure part is connected to the roller fork in any case, a thermally conductive connection is also produced in this case such that the enclosure part can serve for supplementing the heat dissipation.

In a top view, the enclosure part preferably encloses the roller over the entire circumference.

Referred to the vertical direction, the enclosure part preferably extends only over part of the height of the roller fork. A clearance, through which the roller is directly visible, therefore remains between the roller fork and the enclosure part.

The hub motor obviously requires an energy supply that is usually realized in the form of a storage battery provided on the device, on which such a roller is arranged. An electrical interface is preferably provided in order to route corresponding power lines and control lines to the electric motor. This interface may be realized on the enclosure part or the roller fork. It is furthermore preferred to realize the interface in the form of a plug socket. The aforementioned roller is therefore realized in the form of a complete component that merely has to be connected with the aid of a plug.

A cable for connecting the interface to the electric motor may extend on the inner side of the enclosure part or the roller fork. The cable may be connected to the enclosure part or the roller fork by means of clips, bonding or another suitable connecting technique. In any case, the cable is thereby routed in a region that is protected from external influences.

The parts of the hub motor, particularly with respect to an encapsulation body that encloses the motor and/or the running surface carrier and/or the hub body, preferably consist of aluminum such as, e.g., diecast aluminum. This makes it possible to also realize a desired resistance to saltwater. Although the roller fork and/or the enclosure part preferably consist of a steel sheet, it is basically also possible to use an aluminum part for this purpose.

With respect to the manually maneuverable load truck, it is furthermore proposed that the driven roller can be controlled with respect to the power output of the electric motor. This makes it possible to influence the speed, with which such a driven roller can move the load truck. A control device preferably is furthermore arranged on the load truck for this purpose.

It is furthermore preferred to provide two driven rollers on such a load truck. For example, if the load truck is provided with a total of four rollers, the driven rollers preferably consist of the two front or the two rear rollers referred to the normal moving direction of the load truck.

If at least two or more driven rollers are provided, it is also preferred that two of the driven rollers can be controlled independently of one another. In the aforementioned adjacent arrangement of the driven rollers, a cornering maneuver can be initiated by driving only one of the two rollers, wherein the roller that is not driven or driven with less power then lies on the inner side of the turn. With respect to cornering maneuvers, it is preferred to also drive the roller that lies on the inner side of the turn, however, with a reduced speed.

A load truck of this type is usually realized with a handle bar. In this context, it is preferred to arrange the control device on the handle bar.

According to another detail, the control device preferably is specially adapted to the handle bar. This is achieved in that the control device features a through-opening that can be penetrated by the handle bar. Consequently, the control device can be simply pushed on the handle bar, e.g., if it consists of a cantilever handle bar or when it is correspondingly separated for the installation. The control device therefore is captively held on the handle bar.

It can then also be conventionally fixed on the handle bar, e.g., by means of a clip or the like. It may likewise be composed of several parts such as, for example, two correspondingly designed shells that can be joined to one another. The joinable parts preferably form the through-opening. The control device can be fixed on the handle bar by tensioning the joinable parts relative to one another, for example, with the aid of screws that may penetrate the handle bar.

With respect to the control device that extends essentially annular to the handle bar, only part of such an annular body may be used for accommodating the actual control elements.

Such a control device may also feature one or preferably two control elements such as, for example, control buttons. In this context, it is preferred that a control element is realized in the form of a rotary button, wherein the rotational axis coincides with the center axis of the handle bar. Such a control element is preferably arranged movably, for example rotatably or displaceably, relative to the otherwise stationary control device.

A control element preferably can be moved circularly referred to a longitudinal axis of the through-opening. In an exemplary embodiment, the control element is rotatable about the longitudinal axis of the control device, particularly about the longitudinal axis of the handle bar, by an angle between 5 and 90°, preferably between 5 and 30°.

It is preferred to provide two separate control elements in the direction of the longitudinal axis, wherein a stationary section of the control device is located in between the control elements. Both control elements are preferably positioned on the handle bar in an ergonomically favorable fashion and, in particular, designed for being actuated with the thumb.

The stationary section of the control device may feature an internal switch section for cooperating with a control element. It is preferred that the control device features two such switch sections for the respective control elements. In this case, the control element may be rotatably arranged relative to the switch section. It is accordingly preferred to provide a switch section that detects a rotational angle of the control element relative to its home position.

The control element may furthermore feature an engagement cavity that extends in the direction of the longitudinal axis and is radially accessible from outside. This engagement cavity preferably serves for encompassing the handle bar and may in other respects have a diameter that is generally adapted to the through-opening of the control device.

In one embodiment that proved particularly advantageous with respect to its operation, the control element is spring-loaded into a home position. When using a rotatable control element, the corresponding arrangement or design of a spring therefore makes it possible to realize a backward rotation of the control element into its home position once it is no longer rotationally acted upon by the user. The home position may be defined by limit stops. The activation of the one or more driven wheels is accordingly disabled when the user releases the control element or the control elements, particularly while also releasing the handle bar of the load truck.

In one embodiment, the control element is movable, preferably rotatable, in two opposite directions from its home position. In this case, the home position may be defined by the arrangement of two springs that act in opposite directions and preferably exert the same spring force. Conventional metal springs such as, for example, leaf springs or helical pressure springs may be provided. The spring may also form a component of the otherwise stationary section of the control device, for example, due to the formation of a plastic spring arm during the respective manufacture of the control device or a joinable part of the control device in the form of an injection-molded plastic part. The spring as such may also consist of an injection-molded plastic part that can be assigned to the stationary section of the control device. The spring may furthermore also form a component of the control element and cooperate with a stationary section of the control device.

The control element is preferably rotatable in the two opposite directions from its home position by the same rotational angle, for example, in order to activate a forward motion by rotating the control element in one direction and activating a reverse motion by rotating the control element in the opposite direction.

The control device preferably features control electronics. The control electronics include, in particular, a device for carrying out an angular evaluation of the movable control elements and a device for communicating with the control of the motor in the driven wheel or the driven wheels. The control device preferably communicates with the motor control via a bus system.

If two driven wheels are provided, one wheel preferably features a master control and the other wheel features a slave control. The master control communicates with the control device and evaluates its signals.

The control device may also feature a storage battery charge indicator. It may furthermore be provided with an emergency shut-off button. It may consist, in particular, of an impact button. Such an impact button may also serve for realizing a crush protection. The motor of a driven roller, which may potentially still be running, can be deactivated by means of this impact button.

The control device may also feature a lock such that the load truck can only be started and operated by means of the control device with a corresponding key. Sensors, e.g., in the form of RFID sensors may be alternatively or additionally provided, for example, in order to separately confirm the identity of an operator.

With respect to an electrical connection between a driven roller and the control device, it is furthermore preferred that this connection is at least over a significant section installed within the handle bar. According to another detail, it is preferred that the connection between the control device and, for example, an electric cable provided for this purpose is produced on the inside of the control device such that a cable lead-through is not visible from outside. In addition, such an electrical connection is also located in a position, in which it is protected from being damaged under the occasionally rough conditions, to which such a load truck is subjected.

An electrical junction box is preferably provided between the control device and the at least one driven roller, wherein the motor or the motors, the control device and the battery, which preferably is also accommodated in this box, are wired to one another in said junction box.

It is also preferred that the motor of a driven roller contains a control board featuring, in particular, a microprocessor. The electrical connections and control connections with the control device can be realized via a bus system. The control device itself only needs to contain a board for carrying out the corresponding communication.

The control device preferably also features one or more of the characteristics that were already described above in connection with the load truck.

The invention is described in greater detail below with reference to the attached drawings that, however, merely show exemplary embodiments. In these drawings:

FIG. 9 shows a perspective exploded view of the control device;

FIG. 10 shows the control device in the form of a sectioned perspective view; and FIG. 11 shows an illustration according to FIG. 10, in which the line of section is shifted in the axial direction.

Figure 1:
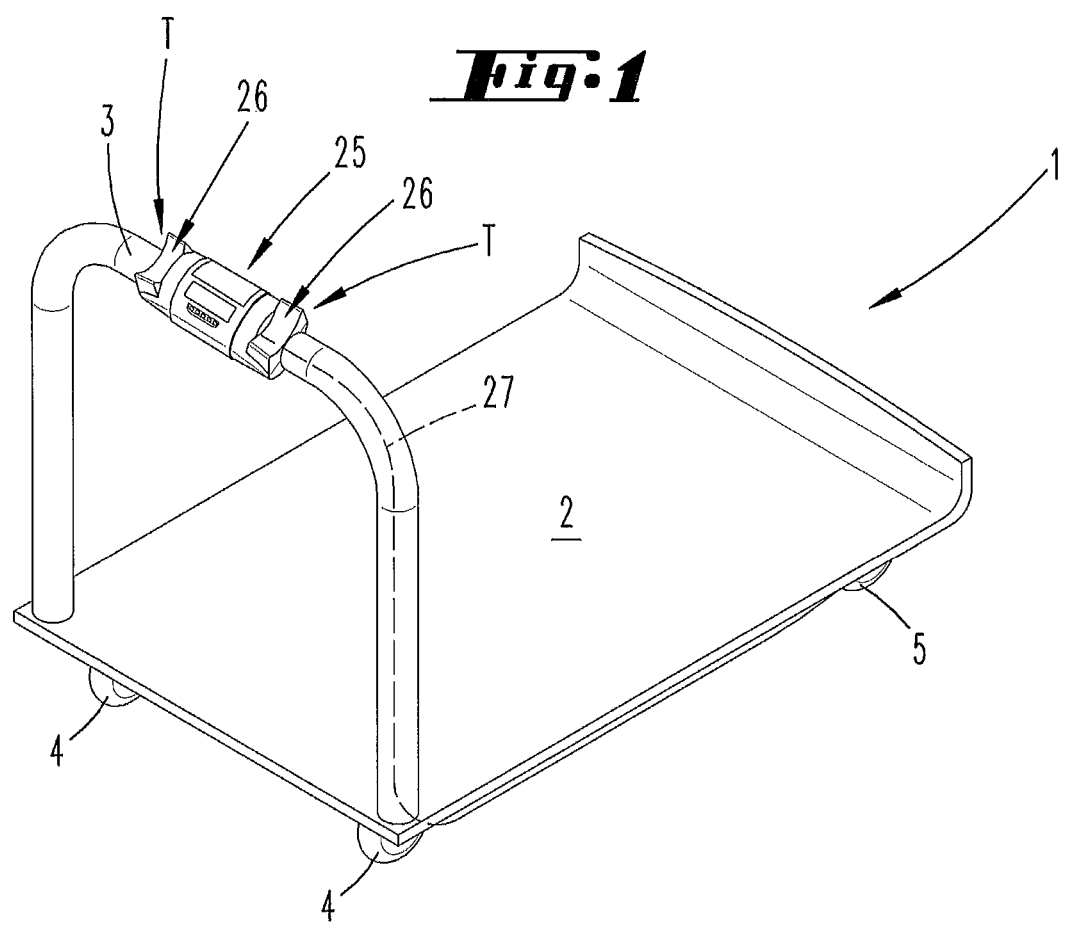
FIG. 1 shows a schematic perspective view of a load truck with two driven electric rollers.
Figure 2:
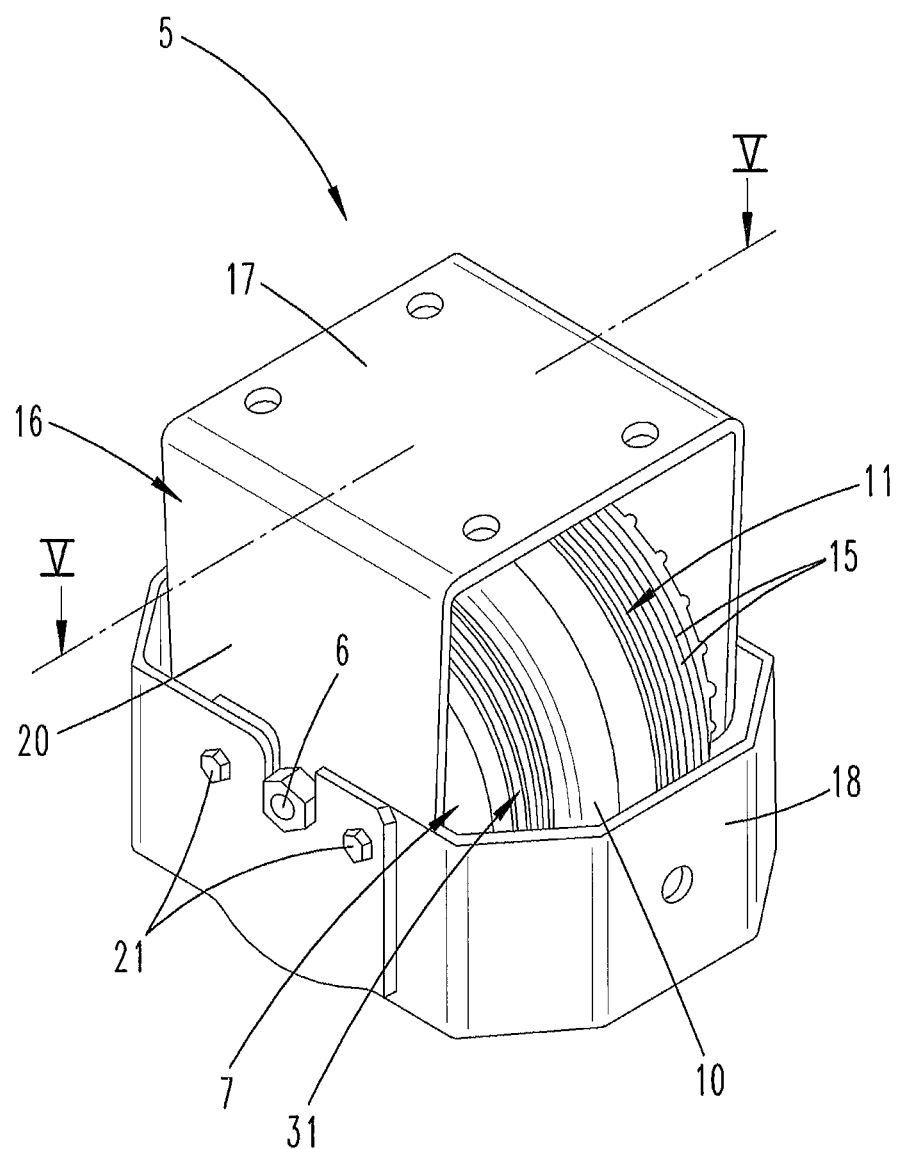
FIG. 2 shows a perspective view of a driven electric roller only.
Figure 3:
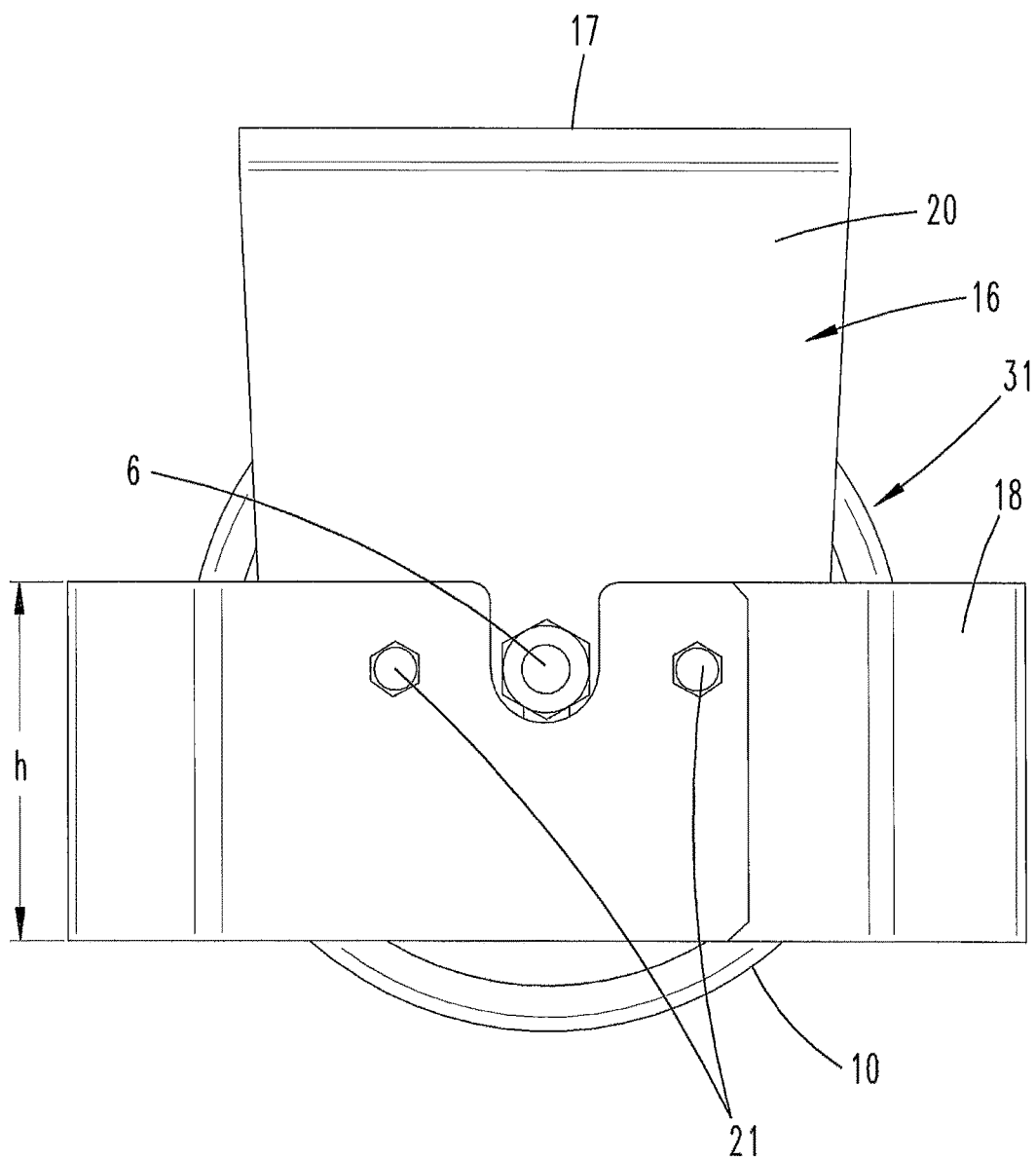
FIG. 3 shows a side view of the roller according to FIG. 2.

A load truck 1 featuring a loading platform 2 and a handle bar 3 for maneuvering the load truck is described below with reference to FIG. 1. In the exemplary embodiment, four rollers are arranged underneath the loading platform 2, wherein two rollers 4 consist of conventional rollers that are not driven and two rollers 5 feature wheels 31 that are electrically driven by a hub motor.

An electrically driven roller 5 is preferably realized in the form of a fixed roller. The non-driven rollers 4 may be realized in the form of steering rollers in the exemplary embodiment.

In this figure, the driven rollers 5 are arranged on the front of the load truck 1 referred to the normal moving direction. They are therefore able to pull the load truck.

According to FIGS. 2-5, an electrically driven roller 5 features a wheel 31 and a wheel axle 6, on which a hub body 7 is arranged. The functional components for an electric drive are arranged within the hub body 7, but not described in greater detail at this point.

The hub body 7 shown is essentially realized cylindrically and features two sidewalls 8 that essentially extend perpendicular to the wheel axle 6 and a circumferential wall 9.

A running surface 10 is arranged on the circumferential wall 9, wherein the running surface 10 forms part of a running surface carrier 11 that is in direct surface contact with an outer side of the circumferential wall 9 of the hub body 7 over at least part of its extent in the direction of the wheel axle 6; see the surfaces lying on top of one another at the reference symbol 12.

The running surface carrier 11 is essentially realized in a pot-like fashion with a pot wall 13 and a pot bottom 14.

The pot bottom 14 overlaps one of the sidewalls 8 of the hub body 7. Referred to a longitudinal center plane M extending transverse to the wheel axle 6, the pot wall 13 extends beyond this center plane M viewed from the pot bottom 14. The longitudinal center plane M preferably extends through the running surface 10 centrally referred to its width illustrated in FIG. 5.

The hub body 7 itself preferably also consists of a pot-shaped part that encompasses the circumferential wall 9 and one of the sidewalls 8, namely the sidewall 8 overlapped by the pot bottom 14 in the exemplary embodiment. On the side of its opening, this pot-shaped part of the hub body 7 is encompassed with respect to a front edge of the pot wall by another pot-shaped part. This additional pot-shaped part features the other sidewall 8 as pot bottom and an overlapping section 29 formed by the pot wall.

Circumferential ribs 15 are formed on the running surface carrier 11, preferably to one side of the running surface 10, and serve for dissipating heat. Since surface contact with the circumferential wall 9, which in a cross section lies thereunder, is preferably also produced in this region, a sound heat conduction and subsequent heat dissipation is achieved by means of the aforementioned circumferential ribs 15.

The overlapping section 29 of the hub body itself is preferably also realized with such circumferential ribs as shown. These circumferential ribs are arranged to the other side of the running surface 10.

The roller 5 furthermore features a roller fork 16. The roller fork 16 encloses the wheel 31 in a U-shaped fashion, wherein the U-crossbar 17 extends in the operative state of the roller above and approximately parallel to a horizontal plane extending through the wheel axle 6.

The roller fork 16 consists of a thin sheet metal part, wherein the sheet metal strip bent into the roller fork may have a width, for example, of 8-16 cm and a thickness of 0.2-0.7 or, if applicable, up to 4 mm.

The roller 5 furthermore features an enclosure part 18 that is essentially aligned horizontally. The enclosure part 18 also consists of a sheet metal part of the described type. The enclosure part 18 horizontally extends completely around the hub motor 19 and the corresponding wheel or roller part provided with the running surface.

Under normal operating conditions, the enclosure part 18 has a vertical height h of 4-12 cm.

This results in a peripheral sheet metal strip that, in particular, may also provide protection against the direct contact of the running surface with any obstacles. The sheet metal strip itself may particularly consist of two parts, namely two U-shaped parts (referred to a top view).

Due to its surface contact in the region of one or both U-limbs 20 of the roller fork 16, the enclosure part 18 is also in thermally conductive contact with the roller fork such that additional heat can be dissipated via the enclosure part 18.

According to another detail, the enclosure part 18 is respectively connected to the roller fork 16 by means of two connecting screws 21 on each U-limb.

Figure 4:
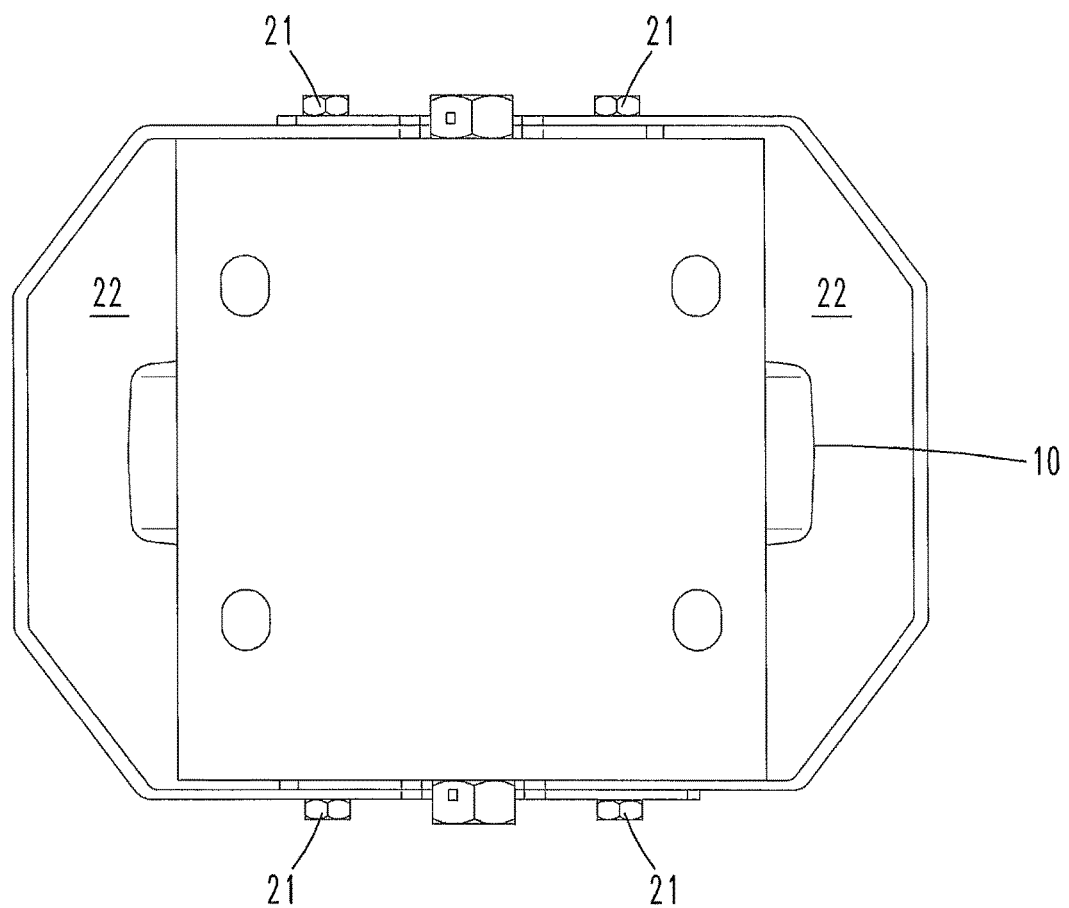
FIG. 4 shows a top view of the roller according to FIG. 2 and FIG. 3.

Since the enclosure part 18 only extends over part of the height H of the roller, a view opening 22 remains between the roller fork 16 and the enclosure part 18; see FIG. 4.

The roller 5 furthermore features an electrical interface that is realized in the form of a plug socket and exposed on a lateral surface of the roller fork 16, i.e. in the region of a U-limb 17 of the roller fork 16. On the inner side, the electrical interface 23 continues in the form of a cable 24 that is routed in overlap with the roller fork 16 and leads into the stationary roller axle 6. The cable 24 may be held by an enclosure 30 realized on the inner side of the fork 16.

Figure 7:
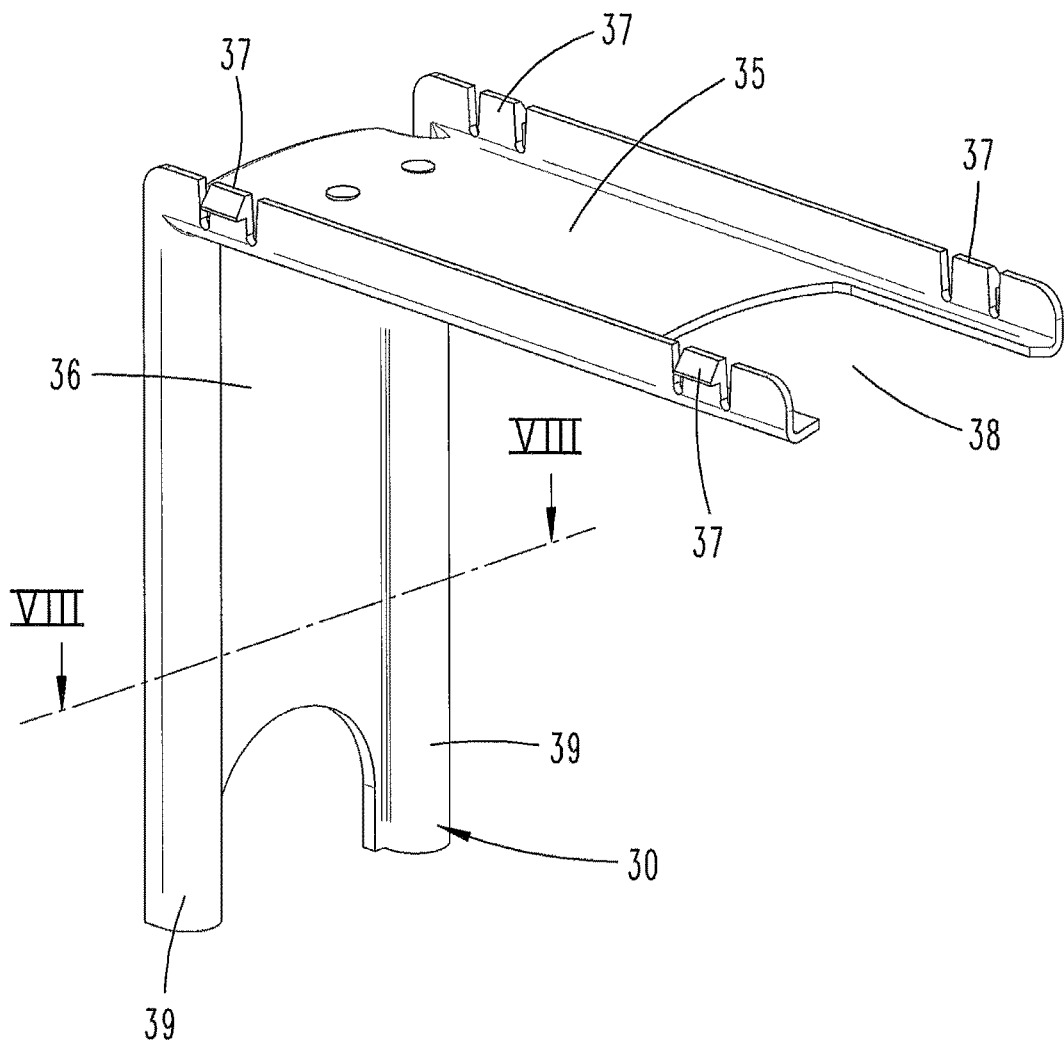
FIG. 7 shows a perspective view of an enclosure that serves for routing cables.

According to the illustration in FIG. 7, the enclosure 30 may consist of an injection-molded plastic part. This plastic part is essentially realized in an L-shaped fashion and features an enclosure web 35 that, according to FIG. 5, essentially extends parallel to the U-crosspiece 17 of the roller fork 16, as well as an enclosure limb 36 that in a cross section extends perpendicular thereto and essentially parallel to the U-limb 20 of the roller fork 16.

Figure 5:
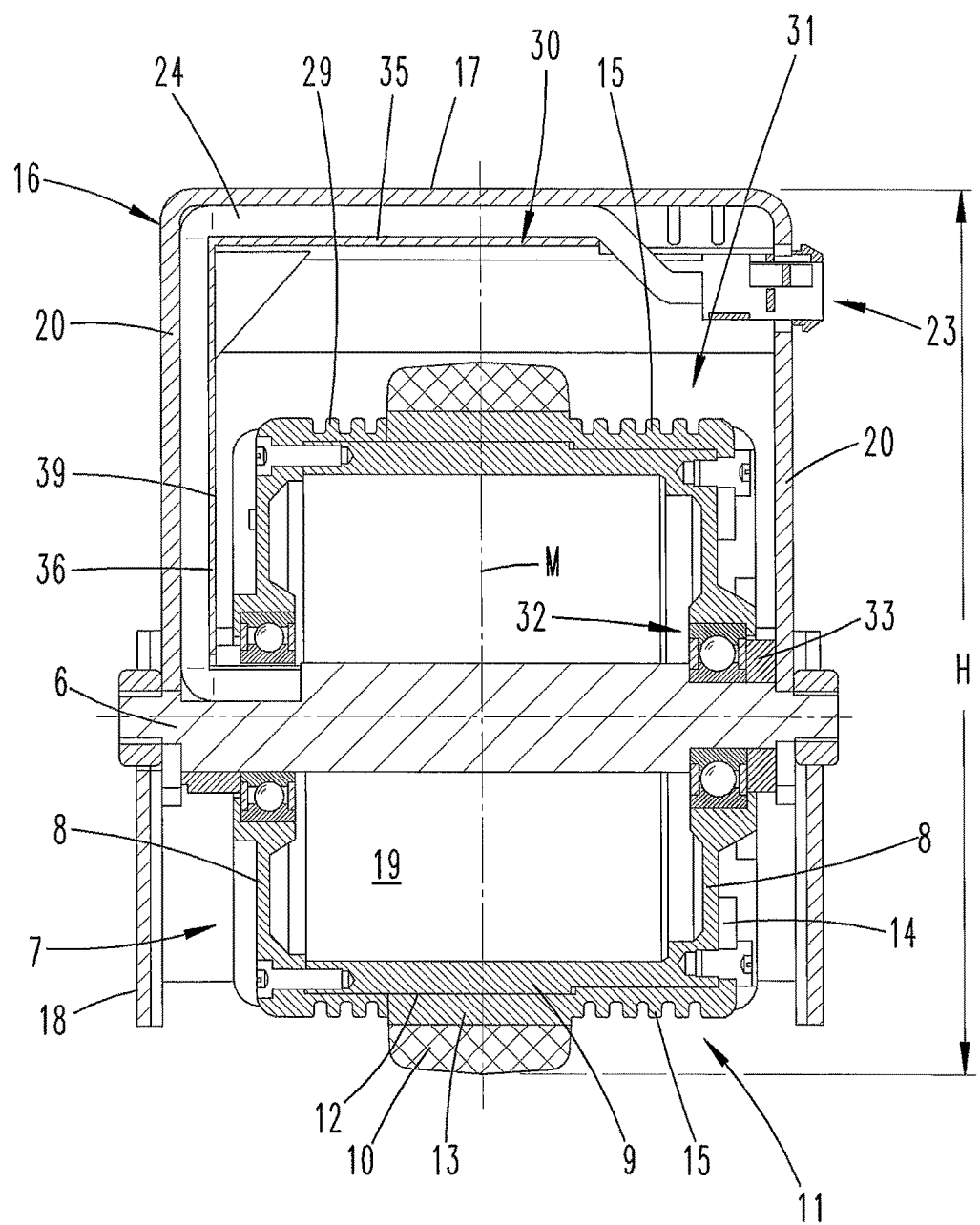
FIG. 5 shows a cross section through the roller according to FIG. 2 along the line V-V.

The width of the enclosure 30 measured perpendicular to the plane of projection in FIG. 5 is preferably chosen smaller than the width of the roller fork 16, particularly its U-limbs 20, measured in the same direction.

Referred to a cross section transverse to the plane of projection in FIG. 5, the enclosure web 35 is essentially realized in a U-shaped fashion (see FIG. 7).

The preferably parallel U-limbs have a cross-sectional length that at least corresponds to and preferably exceeds the largest diameter of the cable 24.

The U-limbs of the enclosure web 35 are realized with snap-on means 37. These snap-on means 37 may be realized in the form of snap-on tabs as shown in order to snap the enclosure 30 onto the roller fork 16.

The bottom-like U-crosspiece of the enclosure web 35 extending at a distance from the U-crosspiece 17 of the roller fork 16 is provided with a window-like recess 38 in the end region that faces away from the enclosure limb 36 in order to lead through the cable 24 in the region of the connection of the electrical interface 23 to the roller fork 16.

Figure 8:
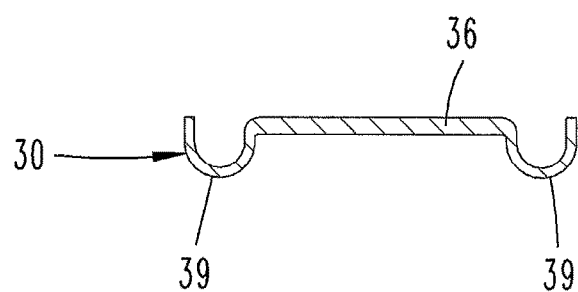
FIG. 8 shows a section along the line VIII-VIII in FIG. 7.

Referred to a cross section according to FIG. 8, the enclosure limb 36 preferably is in surface contact with the inner side of the U-limb 20 with a central section. Widenings 39 of semicircular cross section are realized to both sides of this flat central section and form channels together with the inner wall of the facing U-limb 20. The cable 24 is routed to the wheel axle 6 through at least one of these cable channels.

The load truck 1 is furthermore provided with a control device 25 that is arranged in such a way that it encompasses the handle bar 3. The control device 25 is realized with an essentially circular cross section and features a central through-opening 34 with a longitudinal axis x.

A control element T in the form of an actuating handle 26 is respectively realized on both ends of the control device 25 referred to its longitudinal extent in the direction of the handle bar 3. It extends over the length indicated by the clamp. The actuating handle 26 can be moved about the handle bar 3 along a circular arc that extends in a plane extending perpendicular to the direction of the handle bar 3 in this region.

Each actuating handle 26 serves for actuating one of the driven rollers 5.

The rollers 5 can be activated independently of one another such that it is also possible to only drive one roller.

With respect to the handle bar 3, an electrical connection between a driven roller 5 and the control device 25 may extend within the handle bar 3 as indicated by the cable 27 drawn with a broken line. For this purpose, the handle bar 3 features a through-opening 40 in the overlapping region of the control device 25.

Figure 6:
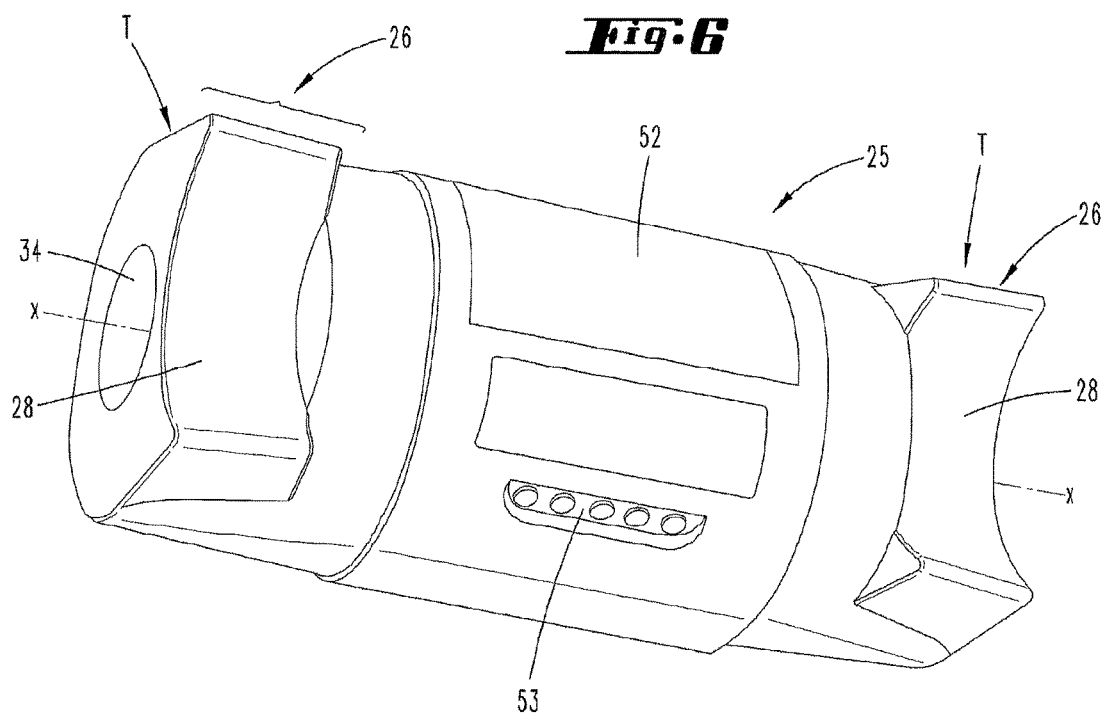
FIG. 6 shows a perspective view of a control device.

The control device is illustrated separately in FIG. 6. According to another detail, the actuating handle 26 shown is realized with a concave surface 28, the end regions of which can be used for the actuation. The actuation may take place in both circumferential directions. For example, the actuating handle is actuated in one direction in order to realize a forward motion and in the other direction in order to realize a reverse motion.

With respect to a circumference of the handle bar, the concave surface 28 extends in this region over a circumferential angle, for example, of 30-270°, preferably about 120°.

The control device 25 features a stationary section that is composed of two joinable shell-shaped parts 41 and 42. These parts are tensioned relative to one another by means of not-shown screws such that they encompass the handle bar 3. The screws penetrate correspondingly positioned bores 43 in the handle bar 3 in this case. The stationary section of the control device 25 is fixed on the handle bar 3 in the axial direction of the handle bar 3, as well as in the circumferential direction thereof.

The stationary section carries a board 44 with control electronics.

Referred to the direction of the through-opening 34 formed by the two parts 41 and 42, the respective ends of the stationary section simultaneously form guide sections 45 that encompass the facing section of the handle bar 3.

Each control element T or each actuating handle 26 is respectively composed of two shell-shaped parts 46 and 47 that are tensioned relative to one another, as well as an actuating part 48 that is covered, in particular, by the shell-shaped part 47.

The actuating part 48 preferably lies, in particular, in the shell-shaped part 47 in a form-fitted fashion in order to cooperate with the assigned guide section 45 in a rotationally sliding fashion.

The guide section 45 fixes the actuating part 48 and said actuating part fixes the actuating handle 26 on the stationary section of the control device 25 referred to the axial direction of the handle bar 3.

The actuating part 48 preferably acts upon Hall sensors 55 arranged on the board 44 by means of three magnets 54 that are spaced apart from one another in the moving direction of the actuating part 48, wherein the actuating part 48 and therefore the entire actuating handle 26 is respectively rotatable by an angle of about 5-10° from a central home position in both rotating directions.

The control element T or the actuating handle 26 is respectively spring-loaded into this home position.

Two contact limbs 49, which are arranged axially adjacent to one another and directed opposite to one another, are respectively fixed on the stationary part 42 and assigned to a guide section 45 in that they essentially place themselves around the guide section 45 in the form of segments of a circle. The free ends of these contact limbs are widened similar to a hammer.

A radial extension 50 of the actuating part 48 acts upon the free side of the hammer-shaped ends facing away from the contact limb 49. A rotation of the actuating handle 26 in a rotating direction causes the radial extension 50 to act upon the contact limb 49 that extends opposite to the rotating direction and can be pivoted about an axis in an end region facing away from the hammerhead end. The pivoting motion caused by the actuation is detected by the magnet/Hall sensor arrangement and interpreted as a control signal. The rotational motion is preferably restricted in that a stopping extension 51, which is directed radially inward, contacts the hammer-shaped end of the other contact limb 49 extending in the rotating direction.

The restricted rotational angle in one rotating direction is identified by the reference symbol a in FIG. 10. The rotational angle (relative to the home position) in the opposite direction is preferably chosen identical.

For example, a leg spring may be arranged in the region of the axial support of each contact limb 29 and prestress the contact limb 49 and therefore the control element T into the home position.

The figures also show an emergency shut-off button in the form of an impact button, by means of which a potentially still running motor of a driven roller can be deactivated.

It is also preferred to arrange a metallic disc element 33 on the wheel axle 6 outside the hub motor, particularly between a ball bearing 32 and the roller fork 16 or the enclosure part 18, respectively. The disc element 33 preferably consists of aluminum. This disc element advantageously makes it possible to enlarge the thermal contact surface with the roller fork 16 and/or the enclosure part 18.

The preceding explanations serve for elucidating all inventions that are included in this application and respectively enhance the prior art independently with at least the following combinations of characteristics, namely:

A roller, which is characterized in that the running surface 10 is realized on a running surface carrier 11 and the running surface carrier 11 is supported on the hub body in a planar fashion on the rear side of the running surface 10.

A roller, which is characterized in that the running surface carrier 11 is realized in a pot-like fashion, wherein a pot bottom 14 extends outside the hub body 7 and essentially perpendicular to the wheel axle 6.

A roller, which is characterized in that the running surface carrier 11 features one or more ribs 15 that form part of the outer surface of the running surface carrier 11.

A roller, which is characterized in that a rib 15 is realized circumferentially.

A roller, which is characterized in that a roller fork 16 is provided, and in that the roller fork 16 is made of a sheet metal part with a width corresponding to 10-times the thickness of the sheet metal part or more, for example, up to 200-times or 300-times the thickness of the sheet metal part.

A roller, which is characterized in that the roller fork 16 is realized in a U-shaped fashion.

A roller, which is characterized in that a horizontally aligned enclosure part 18 is provided.

A roller, which is characterized in that the enclosure part 18 is made of a sheet metal part with a width corresponding to 10-times the thickness of the sheet metal part or more, for example, up to 200-times or 300-times.

A roller, which is characterized in that the enclosure part 18 vertically extends only over part of the height H of the roller 5 or the roller fork 16.

A roller, which is characterized in that the enclosure part 18 and/or the roller fork 16 is/are connected to one or both ends of the wheel axle 6.

A roller, which is characterized in that an electrical interface 23 with the electric motor is realized on the enclosure part 18 or the roller fork 16.

A roller, which is characterized in that the interface 23 is realized in the form of a plug socket.

A roller, which is characterized in that a cable 24 connecting the interface 23 to the electric motor extends on the inner side of the enclosure part 18 or the roller fork 16.

A load truck, which is characterized by a design of the roller 5 with one or more of the described roller characteristics.

A load truck, which is characterized in that a roller 5 can be controlled with respect to the power output of the electric motor.

A load truck, which is characterized in that a control device 25 is arranged on the load truck 1.

A load truck, which is characterized in that two rollers 5 with respectively driven wheels 31 are provided.

A load truck, which is characterized in that two rollers 5 realized with driven wheels 31 can in any case be controlled independently of one another.

A load truck, which is characterized in that the load truck 1 features a handle bar 3, and in that the control device 25 is arranged on the handle bar 3.

A load truck, which is characterized in that the handle bar 3 extends through the control device 25.

A load truck, which is characterized in that the control device 25 essentially extends annular to the handle bar 3 in a cross section.

A load truck, which is characterized in that an electrical connection between a roller 5 with a driven wheel 31 and the control device 25 is installed within the handle bar 3, if applicable, with an intermediately arranged junction box.

A control device, which is characterized in that the control device 25 is essentially realized in the shape of a circular ring in a cross section and features a central through-opening.

A control device, which is characterized in that at least two joinable parts are provided in order to form the through-opening.

A control device, which is characterized in that one or more control elements are provided and movable relative to the otherwise stationary control device 25.

A control device, which is characterized in that a control element can be moved circularly referred to a longitudinal axis of the through-opening.

A control device, which is characterized in that two control elements are provided and separated in the direction of the longitudinal axis by a stationary section of the control device 25 located in between the control elements.

A control device, which is characterized in that a control element is rotatable relative to a stationary internal switch section of the control device 25.

A control device, which is characterized in that a control element features an engagement cavity that extends in the direction of the longitudinal axis and is radially accessible from outside.

A control device, which is characterized in that a control element is spring-loaded into a home position.

A control device, which is characterized in that the control element is movable in two opposite directions from its home position.

A control device, which is characterized in that the control device 25 features control electronics.

LIST OF REFERENCE SYMBOLS

1 Load truck
2 Loading platform
3 Handle bar
4 Roller
5 Roller
6 Wheel axle
7 Hub body
8 Sidewall
9 Circumferential wall
10 Running surface
11 Running surface carrier
12 Surface contact
13 Pot wall
14 Pot bottom
15 Circumferential rib
16 Roller fork
17 U-crosspiece
18 Enclosure part
19 Hub motor
20 U-limb
21 Connecting screw
22 View opening
23 Electrical interface
24 Cable
25 Control device
26 Actuating handle
27 Cable
28 Concave surface
29 Overlapping section
30 Enclosure
31 Wheel
32 Ball bearing
33 Disc element
34 Through-opening
35 Enclosure web
36 Enclosure limb
37 Snap-on means
38 Recess
39 Widening
40 Lead-through opening
41 Part
42 Part
43 Bore
44 Board
45 Guide section
46 Shell-shaped part
47 Shell-shaped part
48 Actuating part
49 Contact limb
50 Radial extension 51 Stopping extension
52 Emergency shut-off button
53 Storage battery charge indicator
54 Magnet
55 Hall sensor
H Height
M Longitudinal center axis
T Control element
h Vertical height
x Longitudinal axis
α Angle

The invention claimed is:

1. A roller (5) comprising
a wheel (31) that is driven by an electric motor and has a stationary wheel axle (6), wherein the electric motor is a hub motor (19) that drives a hub body (7) surrounding the stationary wheel axle (6) with circumferential spacing relative to the stationary wheel axle (6), and
wherein the wheel (31) furthermore comprises a running surface (10), wherein the running surface (10) is on a running surface carrier (11) and the running surface carrier (11) is supported on the hub body (7) in a planar fashion on a rear side of the running surface (10),
wherein further the running surface carrier (11) is pot shaped with a pot bottom (14) extending outside the hub body (7) and essentially perpendicular to the stationary wheel axle (6) and a pot wall overlapping a circumferential wall of the hub body, and
wherein the hub body (7) comprises a pot shaped part that encompasses the circumferential wall (9) and a side wall (8), which side wall (8) is overlapped by the pot bottom (14),
wherein the pot shaped part of the hub body (7) is encompassed with respect to a front edge of the pot wall by another pot shaped part and said another pot shaped part provides an other side wall (8) as pot bottom and an overlapping section (29) formed by the pot wall, and
wherein one or more circumferential ribs (15) are formed on the running surface carrier (11) for dissipating heat.

2. The roller according to claim 1, wherein the running surface carrier (11) has said one or more circumferential ribs (15) that form part of an outer surface of the running surface carrier (11).

3. The roller according to claim 2, wherein said one or more circumferential ribs (15) is realized circumferentially.

4. The roller according to claim 1, wherein a roller fork (16) is provided, and wherein the roller fork (16) is made of a sheet metal part with a width corresponding to 10-times the thickness of the sheet metal part or more.

5. The roller according to claim 4, wherein the roller fork (16) is realized in a U-shaped fashion.

6. The roller according to claim 1, wherein a horizontally aligned enclosure part (18) vertically extends over part of height H of roller (5).

7. The roller according to claim 6, wherein the enclosure part (18) is made of a sheet metal part with a width corresponding to 10-times the thickness of the sheet metal part or more.

8. The roller according to claim 6, wherein the enclosure part (18) vertically extends only over part of the height H of the roller (5) or the roller fork (16).

9. A load truck (1) that can also be maneuvered manually and has at least one roller (4, 5), of which said at least one roller (5) has a driven wheel (31), comprising a design of the roller (5) according to claim 1.

10. The load truck according to claim 9, wherein said at least one roller (5) is controlled with respect to a power output of the electric motor.

11. The load truck according to claim 9, wherein a control device (25) is arranged on the load truck (1).

12. The load truck according to claim 9, wherein said at least one roller comprises two rollers (5) with respectively said driven wheel (31).

13. The load truck according to claim 9, wherein said at least one roller comprises two rollers (5) with said driven wheel (31) which is controlled independently of one another.

14. The roller according to claim 4, wherein the roller fork (16) is made of a sheet metal part with a width corresponding up to 200-times or 300-times the thickness of the sheet metal part.

15. The roller according to claim 7, wherein the enclosure part (18) is made of a sheet metal part with a width corresponding up to 200-times or 300-times the thickness of the sheet metal part.

* * * * *